United States Patent [19]

Wertz et al.

[11] 4,456,158
[45] Jun. 26, 1984

[54] SKI RACK WIND DEFLECTOR

[76] Inventors: Keith Wertz, 2533 S. Deegan Dr., Santa Ana, Calif. 92704; Emmette V. Graham, Jr., 9101 N. 60th St., Paradise Valley, Ariz. 85253

[21] Appl. No.: 472,132

[22] Filed: Mar. 4, 1983

[51] Int. Cl.³ .............................................. B60R 9/12
[52] U.S. Cl. .................................. 224/316; 224/323; 224/324; 224/917
[58] Field of Search ............... 224/316, 323, 324, 325, 224/326, 917

[56] References Cited

U.S. PATENT DOCUMENTS 4,084,735  4/1978  Kappas ........................... 224/324 X

FOREIGN PATENT DOCUMENTS 2612954   9/1977  Fed. Rep. of Germany ...... 224/316
2910895  10/1980  Fed. Rep. of Germany ...... 224/316
3000166   7/1981  Fed. Rep. of Germany ...... 224/316

Primary Examiner—Steven P. Pollard
Attorney, Agent, or Firm—Jackson, Jones & Price

[57] ABSTRACT

An aerodynamic wind deflector for a scissors-type ski rack is disclosed. The wind deflector comprises a parabolic contoured deflector surface attached to a locking member having a T-shaped cross-sectional configuration which is clamped by a scissor clamp of the ski rack. The deflector may be inexpensively manufactured, reduces wind noise and improves the appearance of the ski rack.

7 Claims, 5 Drawing Figures

SKI RACK WIND DEFLECTOR

BACKGROUND OF THE INVENTION

1. Field of the Invention

The field of the present invention is wind deflectors for vehicles and more particularly wind deflectors adapted for use with snow ski racks affixed to vehicles.

2. Background of the Invention

Snow skiing has become a popular pastime and one that typically requires the participant to travel by automobile or vehicle from his residence to the ski facility. Due to their configuration, snow skis are difficult to easily carry within the vehicle and as a result, ski racks have been designed to carry the snow skis atop a vehicle roof, or along the side or a rear surface thereof. In many instances, the ski rack may be affixed to the vehicle at the beginning of the ski season for use during the entire ski season. There may be many instances in which the vehicle is used for transportation, without carrying snow skis in the rack. The ski racks are typically not aerodynamically shaped. The racks create wind noise and increase the wind resistance of the vehicle, thereby decreasing fuel economy.

One of the more popular types of ski racks is a scissor-type rack wherein two jaw or scissor members are hinged at one end thereof. The skis are disposed adjacent the top surface of one of such members and the other member closed down upon the skis to provide a clamping action. Generally, two of the racks are employed for holding the front and rear ends of the skis. The scissors ski racks are susceptible to the problems of causing wind noise and decreased fuel economy.

While applicants are not aware of any structure directed to specifically solving the problems of wind, noise and decreased fuel economy caused by the scissor-type ski racks, several references are known which relate generally to this subject matter. German Pat. No. 2,612,954 discloses a simple wind foil adapted to be fixed to the leading edge of a luggage carrier. U.S. Pat. No. 4,071,176 discloses a partial enclosed ski carrier which includes a streamlined forward end. U.S. Pat. No. 4,084,735 discloses a fully enclosed ski carrier which includes a front end that, according to the specification, is preferably aerodynamically contoured. U.S. Pat. No. 4,095,835 discloses a selectively deployable forward pointing conical shell for streamlining a motor vehicle. U.S. Pat. No. 4,131,309 discloses a wind deflector for vehicles having large front surfaces such as cab-over engine vehicles and busses. U.S. Pat. No. 4,135,754 discloses an illuminated aerodynamic enclosure for the front end of a truck or trailer.

None of the prior art known to applicants discloses a wind deflector particularly adapted for scissor-type ski racks.

SUMMARY OF THE INVENTION

It is accordingly an object of the present invention to provide a wind deflector which may be fitted to a scissors-type ski rack.

Another object of the invention is to provide a wind deflector which reduces wind noise and improves the aerodynamic efficiency of the vehicle with the ski rack.

Still another object of the invention is to provide a wind deflector which mounts securely to the ski rack, and may be quickly and easily removed.

A further object of the invention is to provide a wind deflector for a scissors-type ski rack which may be manufactured inexpensively.

These and other objects of the invention are met by the present invention. The preferred embodiment comprises an aerodynamically shaped deflector surface having a leading edge a pair of parabolically curved surfaces which meet in a rounded leading edge. The deflector surface is affixed to a locking member having a "T" shaped cross-sectional configuration. The locking member is adapted to fit between the closed jaws of the ski rack such that the wind deflector is securely mounted to the ski rack when the jaws of the ski rack are locked together.

The wind deflector may be manufactured inexpensively and provide an attractive appearance.

BRIEF DESCRIPTION OF THE DRAWING

Other features and advantages of the invention will become apparent from the followng description provided in conjunction with the drawings which show preferred embodiments of the invention, and in which like reference numerals designate like parts throughout the figures, and wherein.

DETAILED DESCRIPTION OF THE PREFERRED EMBODIMENTS

The present invention comprises a novel ski rack wind deflector. The following description of the preferred embodiments is provided to enable those skilled in the art to make and use the invention, and sets forth the best modes contemplated by the inventors of carrying out their invention. Various modifications to the preferred embodiments will be readily apparent to those skilled in the art, and the generic principles defined herein may be applied to other embodiments. Thus, the present invention is not intended to be limited to the embodiment shown but is to be accorded the widest scope consistent with the principles and novel features disclosed herein.

Figure 1:
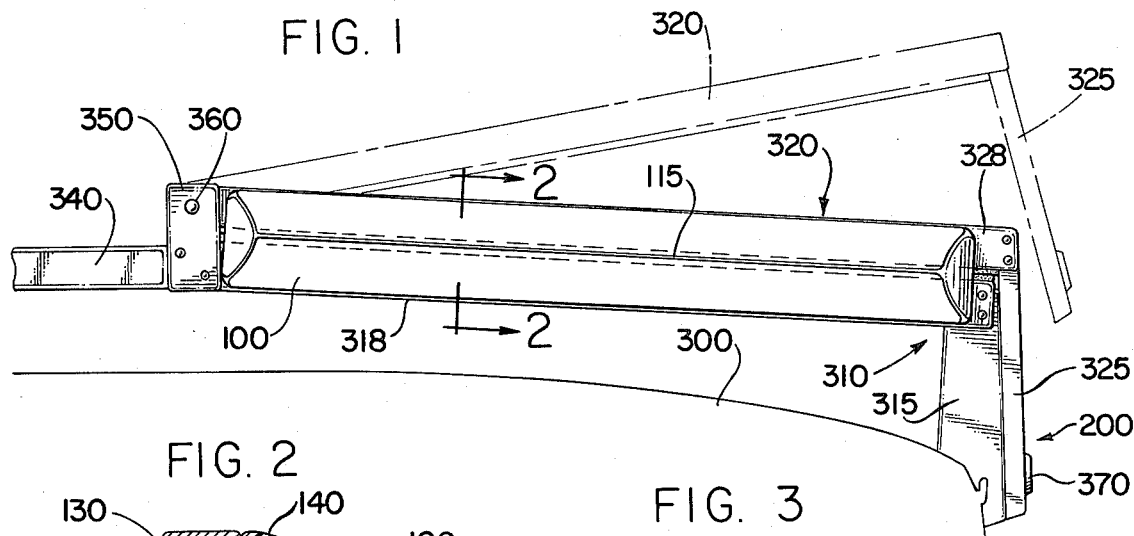
FIG. 1 is a frontal view of the preferred embodiment of the present invention disposed in place in the ski rack.

Referring now to FIG. 1, the preferred embodiment of the wind deflector 100 is shown disposed in position between the two scissors clamp members of a section of the scissors-type ski rack 200. Typically, roof-mounted, scissors-type ski racks comprise front and rear mounting members for securing the front and rear ends of the skis. Each mounting member typically includes two of the scissor clamp members, joined at the middle thereof. Each scissor clamp member is hinged adjacent the center of the mounting member, allowing the user to open a scissor clamp at one or the other side of the vehicle. Only one scissor clamp of a front (or back) mounting member is depicted in FIG. 1, to simplify the description. It should be understood, however, that each scissors clamp member pair may receive a wind deflector as described herein.

A ski rack scissor clamp member 200 is illustrated in position on vehicle roof 300 in FIG. 1, and generally comprises a lower frame assembly 310 which includes an upright member 315 which contacts the vehicle roof 300 and supports the horizontal lower frame member 318 transversely above the vehicle roof 300. Upper frame member 320 is pivotally coupled with the lower frame member 318 through pivot member 350, and is joined with upper upright member 325. The inside end of frame member 320 is pivotably mounted, e.g. by pin 360 or other means, to allow frame member 320 to be pivoted out of the clamping position with the lower frame member 310, to allow the skis to be positioned or removed. A lock 370 is typically provided to latch or lock the scissors jaws in place. Cross member 340 serves to connect the two scissor clamp pairs comprising the typical mounting member.

The foregoing description is provided of a typical scissors-type rack. Other variations of this type of rack may well be available, and the present application invention is not intended to be limited to the specific ski shown and described herein.

Figure 2:
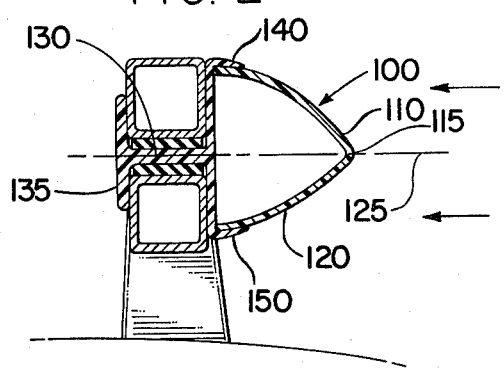
FIG. 2 is a cross-sectional view of the preferred embodiment, taken along line 2—2 of FIG. 1.

The preferred embodiment of FIG. 1 is shown in the cross-sectional view of FIG. 2. The deflector 100 is comprised of deflector surface and a locking member for locking the deflector surface to the ski rack 200. The deflector surface of the deflector 100 comprises an upper surface 110 and a lower surface 120. Each of surfaces 110 and 120 is preferably formed as a parabolic curve, and the two surfaces are formed symmetrically about center line 125. The leading edge 115 of the deflector surface is formed with a small radius to simplify construction.

The locking member of the embodiment disclosed in FIGS. 1 and 2 comprises a member having "T" shaped cross section affixed to and extending from the deflector surface, and comprising center member 130 and stop member 135. Center member 130 is adapted to fit between the upper and lower frame members 315 and 320 of the ski rack, such that, with the frame members in the clamping position, deflector 100 is locked into place, with the leading edge 115 of the deflector surface substantially facing the direction of movement of the vehicle.

It is readily apparent that the wind deflector is adapted to present less resistance to air flowing past the vehicle than the upright forward surfaces of the upper and lower frame members of the ski rack. This is understood to reduce drag on the vehicle due to wind resistance, and hence to cause an improvement in vehicle fuel economy. The wind deflector of the present invention also reduces the wind noise produced by the wind acting on the ski racks, and improves the appearance of the ski rack.

Another advantage of the subject wind deflector is that it may be manufactured in a variety of inexpensive forms. By way of example only, the deflector can be constructed (i) of solid plastic foam material, or (ii) of two injection molded pieces, or (iii) can be extruded, cut to length and fitted with end caps, or (iv) can be blow-molded in one piece. Other types of construction will be readily apparent to those skilled in the art.

One form of construction is illustrated in FIGS. 1 and 2. The embodiment of the wind deflector illustrated therein is fabricated of two pieces, i.e. the deflector surface and the locking member. The locking member includes a pair of curved flanges 140 and 150 which grasp the deflector surface member. In this configuration, the deflector surface member may be a relatively thin-walled member as illustrated e.g., in FIG. 2, or may be fabricated as a solid member.

Figure 3:
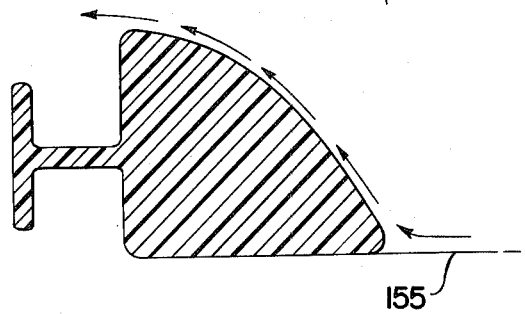
FIG. 3 is a cross-sectional view of a first alternate embodiment of the invention.

The embodiment of the wind deflector of FIG. 3 illustrates another shape of the deflector surface. This surface is also parabolic, but is symmetric, not about the center line, but about the bottom surface line 155. The particular shape of the deflector surface may vary in dependence upon the application, intended placement of the ski rack, and manner and method of construction.

Figure 4:
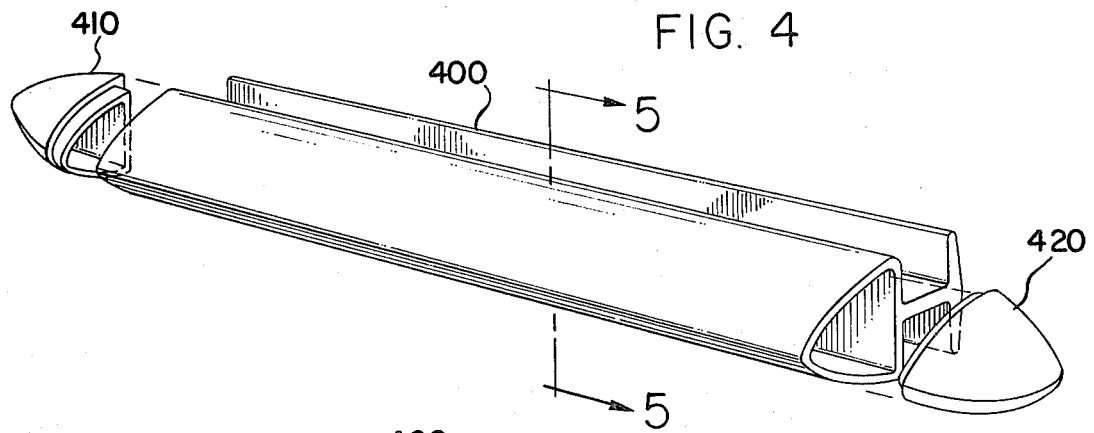
FIG. 4 is an exploded view of a second alternate embodiment of the invention.
Figure 5:
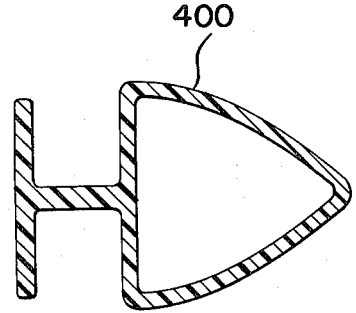
FIG. 5 is a cross-sectional view of the embodiment shown in FIG. 4 and taken along line 5—5 therein.

Referring now to FIGS. 4 and 5, a second alternative embodiment is illustrated. This embodiment is particularly adapted for fabrication by an extrusion process. Member 400 is extruded as an elongated piece having the cross-sectional configuration shown in FIG. 5, which may simply be cut to the appropriate length for the particular ski rack application. End caps 410 and 420 may be molded and fit into the open ends of the elongated member 400. The deflector may be extruded from "ABS" plastic, or various other materials as will be apparent to those skilled in the art.

Although the foregoing has been directed to particular embodiments of the invention, changes and modifications thereto can be made by persons skilled in the art without departing from the spirit and scope of the invention as defined by the following claims.

What is claimed is:

1. A removable wind deflector adapted for use with a scissors-type ski rack having clamp members for clamping skis when in a clamping position, comprising an aerodynamically shaped deflector surface coupled to a locking member adapted to be held by clamp members of the ski rack when in such clamping position.

2. The wind deflector of claim 1 wherein said deflector surface has a leading edge and comprises an upper and lower surface, each surface shaped in a parabolic curved symmetrical about a center line through the leading edge.

3. The wind deflector of claim 1 wherein said locking member has a "T" shaped cross-sectional configuration.

4. The wind deflector of claim 1 wherein said deflector surface and said locking member are of integral construction.

5. The wind deflector of claim 1 wherein said deflector surface comprises a single curved surface formed in the contour of a parabolic curve.

6. The wind deflector of claim 1 wherein said deflector surface defines the external surface of a solid foam member.

7. A removable wind deflector adapted for use with a ski rack having clamp members adapted to secure snow skis, comprising an aerodynamically shaped deflector surface affixed to a locking member adapted to be secured by said clamp members.

* * * * *